(12) United States Patent
Tsai et al.

(10) Patent No.: US 6,665,698 B1
(45) Date of Patent: Dec. 16, 2003

(54) HIGH SPEED INCREMENTER/DECREMENTER

(75) Inventors: Li C Tsai, Ft Collins, CO (US); Daniel Krueger, Ft Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/569,658

(22) Filed: May 12, 2000

(51) Int. Cl.[7] ................................................. G06F 7/50
(52) U.S. Cl. ...................................................... 708/672
(58) Field of Search ................................. 708/552, 553, 708/494, 670, 672

(56) References Cited

U.S. PATENT DOCUMENTS 3,989,940 A * 11/1976 Kihara ........................ 708/672
4,153,939 A * 5/1979 Kudou ........................ 708/672
5,018,094 A * 5/1991 Fischer et al. ............... 708/672
5,384,724 A * 1/1995 Jagini .......................... 708/672

OTHER PUBLICATIONS

"MOSFET Look–Ahead Bit Incrementer/Decrementer", IBM Technical Disclosure Bulletin, vol. 28, No. 2, Jul. 1985, pp. 741–774.*
"Increment Decrement Logic", IBM Technical Disclosure Bulletin, vol. 11, No. 3, Aug. 1968, pp. 297–298.*

* cited by examiner

Primary Examiner—Chuong Dinh Ngo

(57) ABSTRACT

A high speed incrementer/decrementer design is presented that computes the propagate, generate, and kill signals which are used to compute carries and sums from the incrementer inputs. By setting one input to "0" and the carry-in to "1", the adder is used as an incrementer. In the design of the invention, a bit-wise decision is made whether to complement the input bit or not. The design also allows decrementing and supports both unsigned and 2's complement number representations.

14 Claims, 10 Drawing Sheets

US 6,665,698 B1

HIGH SPEED INCREMENTER/DECREMENTER

BACKGROUND OF THE INVENTION

In standard electronic circuits that include logic functionality, such as microprocessors that perform simple address incrementing, adders are typically used to perform the incrementing. However, the use of adders to perform simple incrementing is typically quite inefficient since a full adder requires more circuitry, and therefore more chip area and power, and is also typically slower than a simple incrementer. Accordingly, a need exists for a high speed incrementer (and decrementer) that can perform the requirements of an incrementer with less power and in a smaller amount of space.

SUMMARY OF THE INVENTION

A high speed incrementer/decrementer design is presented that is easy to implement, requires less chip space and less power, and is faster than prior art adders. In accordance with the design of the invention, carries and sums are computed using propagate, generate, and kill signals that are derived from the incrementer inputs. By setting one input to "0" and the carry-in to "1", the adder is used as an incrementer. In the design of the invention, a decision is made whether to complement the input or not. The design also allows decrementing and supports both unsigned and 2's complement number representations.

BRIEF DESCRIPTION OF THE DRAWING

The invention will be better understood from a reading of the following detailed description taken in conjunction with the drawing in which like reference designators are used to designate like elements, and in which.

DETAILED DESCRIPTION

Figure 1:
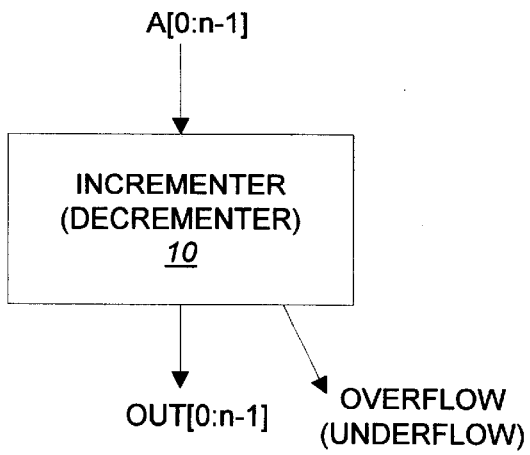
FIG. 1 is a block diagram of an incrementer/decrementer in accordance with the invention.

FIG. 1 is a block diagram of an incrementer/decrementer 10 implemented in accordance with the invention. As shown, incrementer/decrementer 10 receives an n-bit input signal A[0:n−1] and generates an n-bit output signal Out [0:n−1] with an overflow (or underflow) bit which indicates whether the increment (or decrement) of the input signal A[0:n−1] resulted in an overflow (or underflow).

Figure 2:
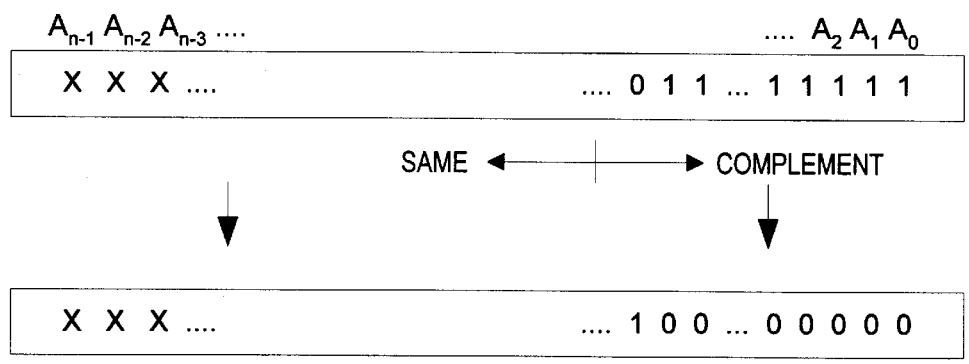
FIG. 2 is a diagram illustrating an increment of an unsigned n-bit number.

FIG. 2 is a diagram illustrating an increment for an unsigned n-bit number. As shown, the increment is accomplished by complementing each input bit from the least significant bit $A_0$ through the first bit $A_x$ that has a logical "0" value. For example, if an 8-bit input has a binary value of "00000111" (i.e., "7" decimal), bits $A_0, A_1, A_2$, and $A_3$ are each complemented (since the least significant bit that has a logical "0" value is $A_3$), resulting in an incremented value of binary "00001000" (i.e., "8" decimal). An input signal value of all "1"s will result in an overflow condition when incremented. One skilled in the art will appreciate that the ones-complement technique of incrementing a signal is easily extendable to an n-bit input signal of any length n (e.g., 16-, 32-, 64-, 128-, 256- and higher bit integers).

Figure 3:
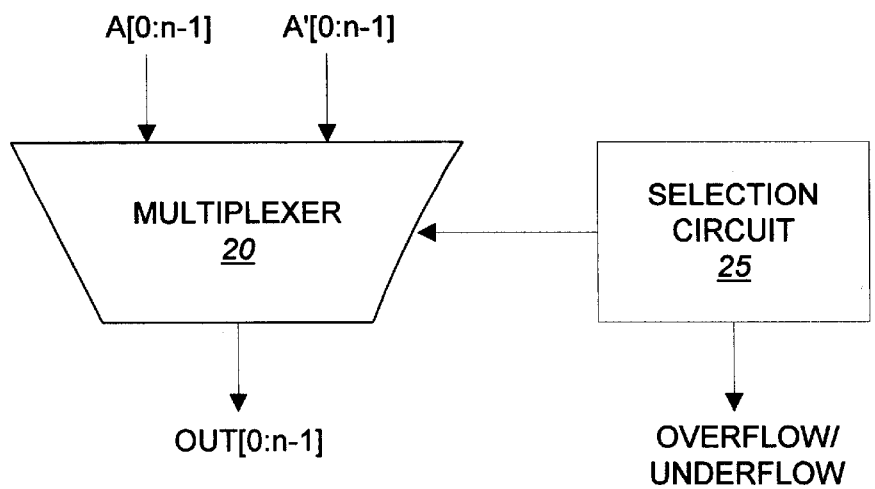
FIG. 3 is a logic diagram of an incrementer implemented in accordance with the invention.

FIG. 3 is a logic diagram of an incrementer implemented in accordance with the invention. As illustrated, incrementer 10 comprises a multiplexer 20 and selection circuit 25. Multiplexer 20 receives an n-bit input signal $A_0 \ldots A_{n-1}$ and complement input signal bit $A_0' \ldots A_{n-1'}$, and outputs an n-bit output signal $Out_0 \ldots Out_{n-1}$. For each bit $0 \ldots n-1$, selection circuit 25 selects either the input signal bit $A_0 \ldots A_{n-1}$ or complement input signal bit $A_0' \ldots A_{n-1}'$ for output as the corresponding output signal bit $Out_0 \ldots Out_{n-1}$. In particular, for each bit x in the range $0 \ldots n-1$, selection circuit 25 selects the complement input signal bit $A_x'$ for output as $Out_x$ if all lower significant input signal bits have a logical "1" value, and selects the input signal bit $A_i$ for output as $Out_i$ if any of the lower significant input signal bits have a logical "0" value.

Figure 4A:
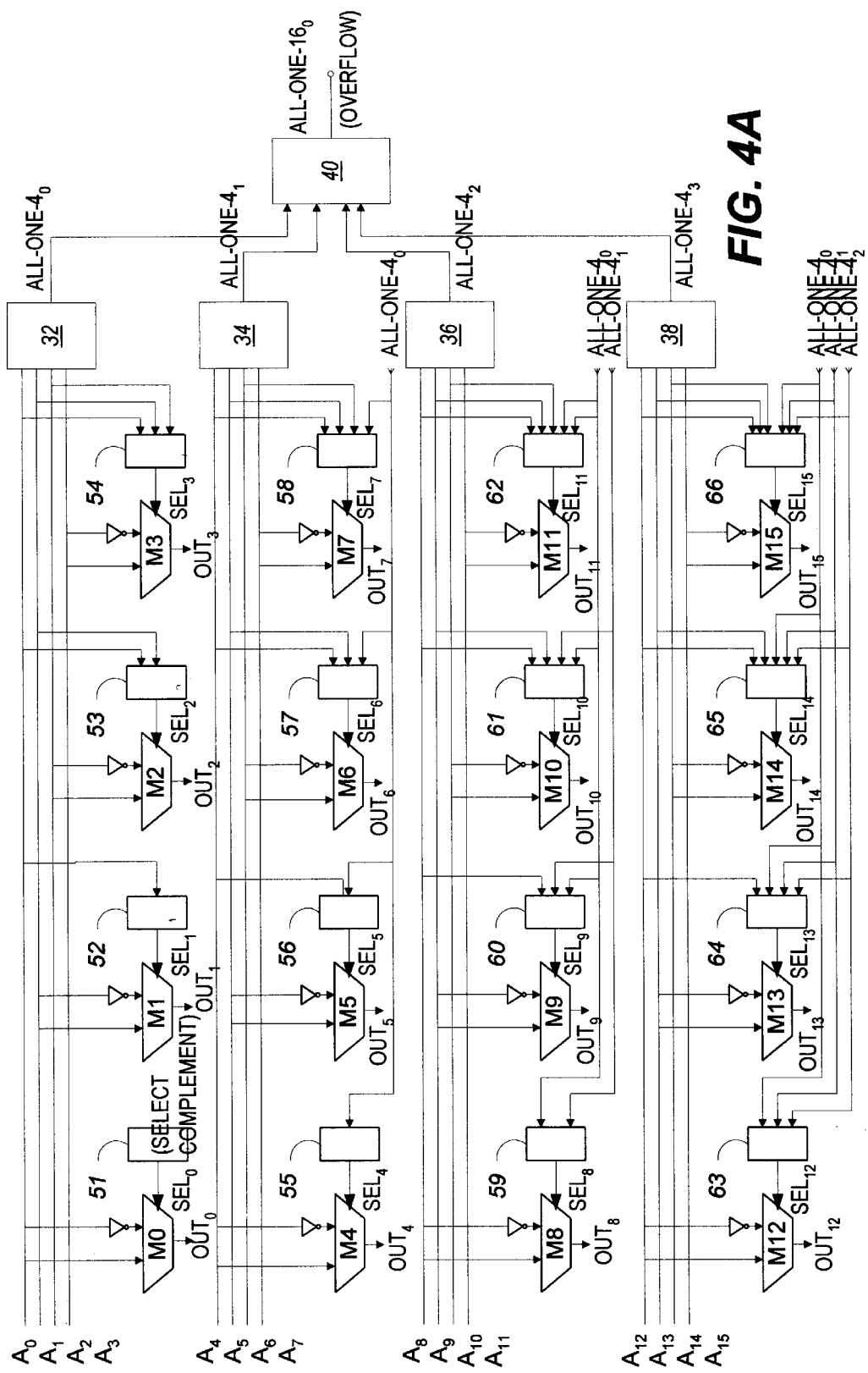
FIG. 4A is a logic diagram of a preferred embodiment of a 16-bit incrementer implemented in accordance with the invention.

FIG. 4A is a logic diagram of a preferred embodiment of a 16-bit incrementer implemented in accordance with the invention. As illustrated, multiplexer 20 comprises n (where n=16) bit-level multiplexers M0 ... M15, each receiving its corresponding input signal bit $A_0$ ... $A_{15}$ and complement input signal bit $A_0'$ ... $A_{15}'$. The bits $A_0$ ... $A_{15}$ of input signal A are partitioned into mutually-exclusive groupings of successively significant bits. In particular, in the embodiment shown in FIG. 4A, the input signal bits are grouped by four, including input signal bit groupings $A_0$ ... $A_3$, $A_4$ ... $A_7$, $A_8$ ... $A_{11}$, and $A_{12}$ ... $A_{15}$.

Figure 4B:
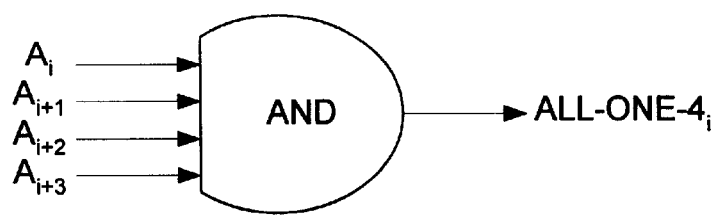
FIG. 4B is a logic diagram of a preferred embodiment of a group all-one-4 evaluator implemented in accordance with the invention.
Figure 4C:
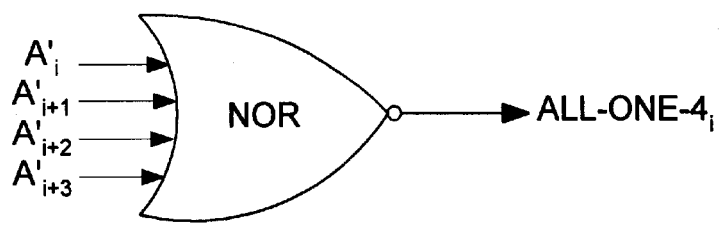
FIG. 4C is a logic diagram of an alternative preferred embodiment of a group all-one-4 evaluator implemented in accordance with the invention.

The selection circuit 25 includes a plurality of group all-one evaluators 32, 34, 36, 38, one per input signal bit grouping. Each group all-one evaluator 32, 34, 36, 38 is coupled to receive the input signal bits in its corresponding input signal bit grouping. In the illustrative embodiment, the input signal bits are grouped in groups of four. Accordingly, group all-one evaluator 32 receives bits $A_0$ ... $A_3$, evaluator 34 receives bits $A_4$ ... $A_7$, evaluator 36 receives bits $A_8$ ... $A_{11}$, and evaluator 38 receives bits $A_{12}$ ... $A_{15}$. Each group all-one-4 evaluator 32, 34, 36, 38 produces a respective evaluator signal All-One-$4_0$, All-One-$4_1$, All-One-$4_2$, All-One-$4_3$ which indicates if all input signal bits $A_0$ ... $A_3$, $A_4$ ... $A_7$, $A_8$ ... $A_{11}$, $A_{12}$ ... $A_{15}$ in its respective input signal bit grouping have a logical "1" value. In the preferred embodiment, group all-one evaluators 32, 34, 36, 38 are each implemented with a logical AND gate, as illustrated in FIG. 4B, that receives each of the input signal bits in its corresponding input signal bit grouping. In an alternative preferred embodiment, group all-one evaluators 32, 34, 36, 38 are each implemented with a logical NOR gate, as illustrated in FIG. 4C, that receives the complement of each of the input signal bits in its corresponding input signal bit grouping.

The outputs of the group all-one-4 evaluators 32, 34, 36, 38 are fed into a group all-one-16 evaluator. All-one-16 evaluator 40 produces an evaluator signal All-One-$16_0$, which indicates if all of the group-one-4 evaluator signals All-One-$4_0$, All-One-$4_1$, All-One-$4_2$, All-One-$4_3$ have a logical "1" value. In the preferred embodiment, group all-one-16 evaluator 40 is implemented with a logical AND gate, as illustrated in FIG. 4B, that receives each of the group-one-4 evaluator signals All-One-$4_0$, All-One-$4_1$, All-One-$4_2$, All-One-$4_3$. In an alternative preferred embodiment, group all-one-16 evaluator 40 is implemented with a logical NOR gate, as illustrated in FIG. 4C, that receives the complement of each of the group-one-4 evaluator signals All-One-$4_0$, All-One-$4_1$, All-One-$4_2$, All-One-$4_3$. The all-one-16 evaluator signal All-One-$16_0$ corresponds to the overflow signal of the 16-bit incrementer, and goes true when an increment is performed when all input signal bits have a value of "1".

Selection circuit 25 also includes a plurality of partial all-one evaluators 51–66. Each partial all-one evaluator 51–66 corresponds to one each of multiplexers M0 ... M15. Each partial all-one evaluator 51–66 is coupled to receive the evaluator signal of each group all-one evaluator 32, 34, 36, 38. The evaluator signal received by a partial all-one evaluator 51–66 evaluates an input signal bit grouping comprising all lower significant bits than the input signal bit associated with the respective multiplexer M0 ... M15. Each partial all-one evaluator 51–66 also receives as input all of the lower significant input signal bits than the input signal bit associated with the respective multiplexer M0 ... M15 that have not already been evaluated by one of the group all-one evaluators 51–56 received by the respective partial all-one evaluator. Accordingly, as illustrated in FIG. 4A, partial all-one evaluator 51 (which is associated with multiplexer M0 and consequently input signal bit $A_0$) always selects the complement input signal bit $A_0'$ since none of the group all-one evaluators evaluate bits that are all lower significant bits than $A_0$. Partial all-one evaluator 52 (which is associated with multiplexer M1 and consequently input signal bit $A_1$) receives bit $A_0$ since it is the only lower significant bit in the $A_0$ ... $A_3$ input signal bit grouping. Partial all-one evaluator 53 (which is associated with multiplexer M2 and consequently input signal bit $A_2$) receives bit $A_0$ and $A_1$ since $A_0$ and $A_1$ are lower significant bits than $A_2$ in the $A_0$ ... $A_3$ input signal bit grouping. Partial all-one evaluator 54 (which is associated with multiplexer M3 and consequently input signal bit $A_3$) receives bits $A_0$, $A_1$, and $A_2$ since $A_0$, $A_1$, and $A_2$ are lower significant bits than $A_3$ in the $A_0$ ... $A_3$ input signal bit grouping.

Partial all-one evaluator 55 (which is associated with multiplexer M4 and consequently input signal bit A4) receives signal All-One-$4_0$ since group all-one evaluator 32 evaluates bits $A_0$ ... $A_3$, which are all lower significant bits than $A_4$. Partial all-one evaluator 56 (which is associated with multiplexer M5 and consequently input signal bit $A_5$) receives signal All-One-$4_0$ and bit $A_4$ since $A_4$ is the only lower significant bit in the $A_4$ ... $A_7$ input signal bit grouping. Partial all-one evaluator 57 (which is associated with multiplexer M6 and consequently input signal bit $A_6$) receives signal All-One-$4_0$ and bits $A_4$ and $A_5$ since $A_4$ and $A_5$ are lower significant bits than $A_6$ in the $A_4$ ... $A_7$ input signal bit grouping. Partial all-one evaluator 58 (which is associated with multiplexer M7 and consequently input signal bit $A_7$) receives signal All-One-$4_0$ and bits $A_4$, $A_5$, and $A_6$ since $A_4$, $A_5$, and $A_6$ are lower significant bits than $A_7$ in the $A_4$ ... $A_7$ input signal bit grouping.

Partial all-one evaluator 59 (which is associated with multiplexer M8 and consequently input signal bit $A_8$) receives signals All-One-$4_0$ and All-One-$4_1$ since group all-one evaluator 32 evaluates bits $A_0$ ... $A_3$, and group all-one evaluator 34 evaluates bits $A_4$ ... $A_7$, which are all lower significant bits than $A_8$. Partial all-one evaluator 60 (which is associated with multiplexer M9 and consequently input signal bit $A_9$) receives signal All-One-$4_0$, All-One-$4_1$, and bit $A_8$ since $A_8$ is the only lower significant bit than $A_9$ in the $A_8$ ... $A_{11}$ input signal bit grouping. Partial all-one evaluator 61 (which is associated with multiplexer M10 and consequently input signal bit $A_{10}$) receives signal All-One-$4_0$, All-One-$4_1$, and bits $A_8$ and $A_9$ since $A_8$ and $A_9$ are lower significant bits than $A_{10}$ in the $A_8$ ... $A_{11}$ input signal bit grouping. Partial all-one evaluator 62 (which is associated with multiplexer M11 and consequently input signal bit $A_{11}$) receives signal All-One-$4_0$, All-One-$4_1$, and bits $A_8$, $A_9$, and $A_{10}$ since $A_8$, $A_9$, and $A_{10}$ are lower significant bits than $A_{11}$ in the $A_8$ ... $A_{11}$ input signal bit grouping.

Partial all-one evaluator 63 (which is associated with multiplexer M12 and consequently input signal bit $A_{12}$) receives signals All-One-$4_0$, All-One-$4_1$, and All-One-$4_2$, since group all-one evaluator 32 evaluates bits $A_0$ ... $A_3$, and group all-one evaluator 34 evaluates bits $A_4$ ... $A_7$, which are all lower significant bits than $A_{12}$. Partial all-one evaluator 64 (which is associated with multiplexer M13 and consequently input signal bit $A_{13}$) receives signal All-One-$4_0$, All-One-$4_1$, All-One-$4_2$, and bit $A_{12}$ since $A_{12}$ is the only lower significant bit than $A_{13}$ in the $A_{12}$ ... $A_{15}$ input signal bit grouping. Partial all-one evaluator 65 (which is associated with multiplexer M14 and consequently input signal bit $A_{14}$) receives signal All-One-$4_0$, All-One-$4_1$, All-One-$4_2$, and bits $A_{12}$ and $A_{13}$ since $A_{12}$ and $A_{13}$ are lower significant bits than $A_{14}$ in the $A_{12}$ ... $A_{14}$ input signal bit grouping. Partial all-one evaluator 66 (which is associated with multiplexer M15 and consequently input signal bit $A_{15}$) receives signal All-One-$4_0$, All-One-$4_1$, All-One-$4_2$, and bits $A_{12}$, $A_{13}$, and $A_{14}$ since $A_{12}$, $A_{13}$, and $A_{14}$ are lower significant bits than $A_{15}$ in the $A_{12} \ldots A_{15}$ input signal bit grouping.

Each partial all-one evaluator 51–66 produces a respective bit-mux select signal $SEL_0$, $SEL_1$, ..., $SEL_{15}$ which indicates if all of its input signals (i.e., all signal input to the respective partial all-one evaluator) have a logical "1" value. Because the inputs to each respective partial all-one evaluator 51–66 includes each lower significant raw or already evaluated (via the group all-one evaluators) input signal bit, the output select signals $SEL_0$, $SEL_1$, ..., $SEL_{15}$ of each partial all-one evaluator 51–66 are used as the select input to the respective bit-multiplexers M0 ... M15 to determine whether the associated input signal bit or bit complement are output by the corresponding bit-multiplexer M0 ... M15. The select signal $SEL_0$, $SEL_1$, ..., $SEL_{15}$ selects the complement input signal bit as output if all inputs evaluate to a logical "1", and selects the input signal bit as output if any of the inputs evaluate to a logical "0", thereby performing an increment of an unsigned integer. An increment of a signed twos-complement integer, wherein the most significant bit of the input $A_{n-1}$ is the sign bit, may be accomplished using the design of the invention by propagating the sign bit directly to the output (i.e., not including the sign bit in the complement calculations). In the preferred embodiment, partial all-one evaluators 51 ... 66 are each implemented with a logical AND gate, as illustrated. In an alternative preferred embodiment, partial all-one evaluators 51 ... 66 are each implemented with a logical NOR gate that receives the complement of each of its inputs.

Figure 4D:
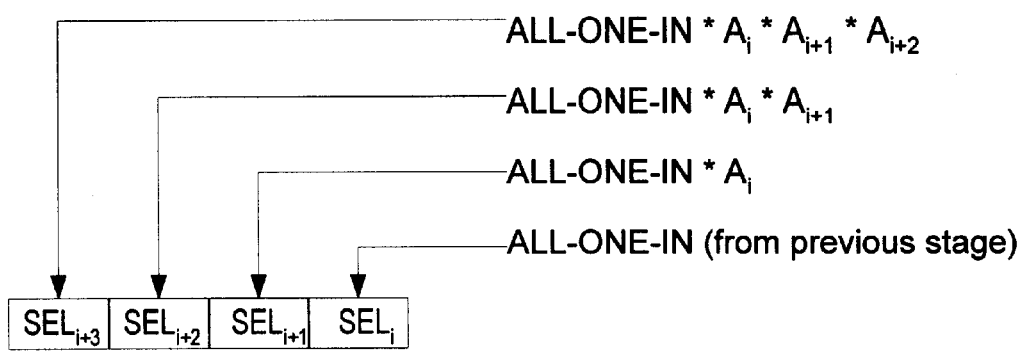
FIG. 4D is an input diagram illustrating the function performed by the partial all-one evaluator for each local bit grouping.

FIG. 4D is an input diagram illustrating the function performed by the partial all-one evaluator for each local bit grouping. This embodiment shows a 4-bit grouping (e.g., $A_0 \ldots A_3$, $A_4 \ldots A_7$, $A_8 \ldots A_{11}$, and $A_{12} \ldots A_{15}$ for a 16-bit incrementer/decrementer), where i is the first integer in each group (i.e., 0, 4, 8, or 12), and All-One-In is logically true if each group all-one evaluator representing a group of lower significant bits than the current bit grouping indicates that all of its bits are "1". In the 16-bit incrementer embodiment of FIG. 4A, there are four such local partial all-one evaluator circuits, one for each of the different four-bit groupings $A_0 \ldots A_3$, $A_4 \ldots A_7$, $A_8 \ldots A_{11}$, and $A_{12} \ldots A_{15}$.

Figure 4E:
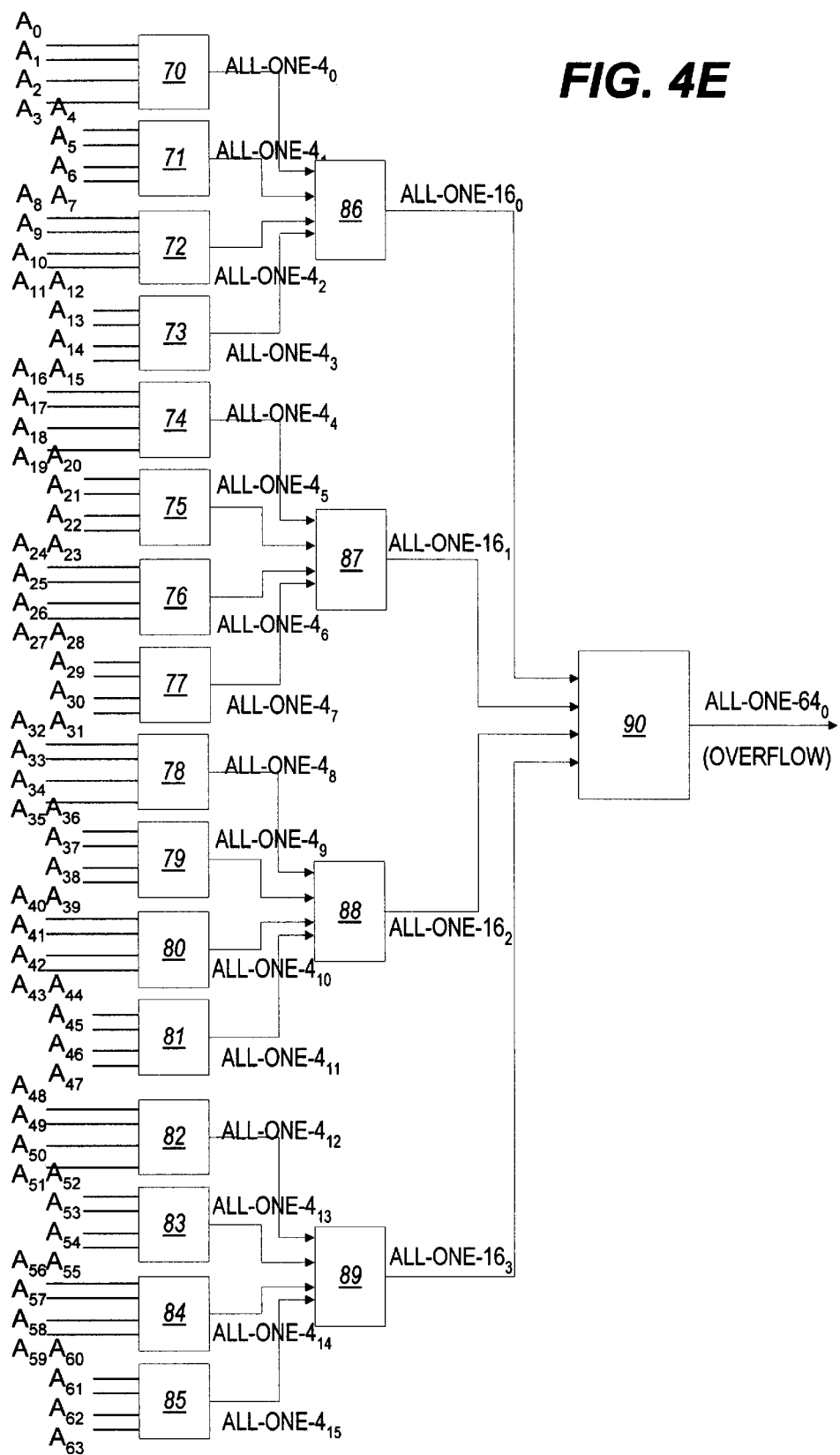
FIG. 4E is a logic diagram of a preferred embodiment of a look-ahead circuit implemented in accordance with the invention for a 64-bit incrementer.
Figure 4F:
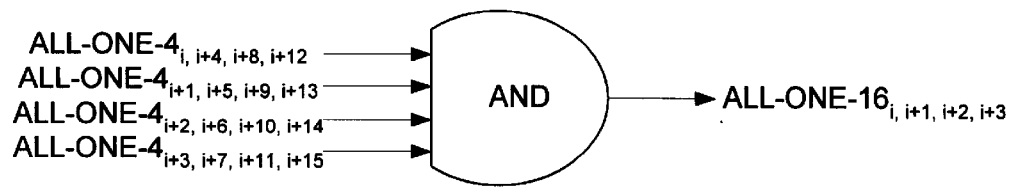
FIG. 4F is a logic diagram of a preferred embodiment of a group all-one-16 evaluator implemented in accordance with the invention.
Figure 4G:
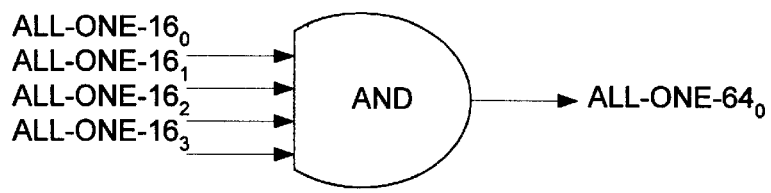
FIG. 4G is a logic diagram of a preferred embodiment of a group all-one-64 evaluator implemented in accordance with the invention.

It will be appreciated that the design of the invention may be extended to any number of input bits n. Because a trade-off exists between the number of gate delay stages and the number of inputs per gate, the larger the number of bits in the input A, the more likely the design will call for a higher number of gate stages. For example, FIG. 4E is a block diagram of an all-one look-ahead circuit for a 64-bit incrementer. (For simplicity, the multiplexer circuits are not shown; however, the multiplexer circuits are implemented in accordance with the same principles used in the 16-bit incrementer implementation of FIG. 4A, taking into account the additional input signals and look-ahead circuits.) In the all-one look-ahead circuit design of a 64-bit incrementer, the group all-one evaluators 70–85 are implemented using all-one-4's (as described in FIG. 4A) which each feed into group all-one-16 evaluators 86–89, which in turn feed into a group all-one-64 evaluator 90. The output All-One-$64_0$ of group all-one-64 evaluator 90 indicates whether an overflow condition occurred. FIGS. 4F and 4G illustrate a preferred implementation of the group all-one-16 and group all-one-64 evaluators, respectively, using AND gates that each receive lower stage group all-one-4 evaluator outputs and lower stage group all-one-16 evaluator outputs. It will be appreciated that a NOR gate implementation (not shown) with complemented inputs may also be used, or any other logic circuit that performs the same function.

Figure 5:
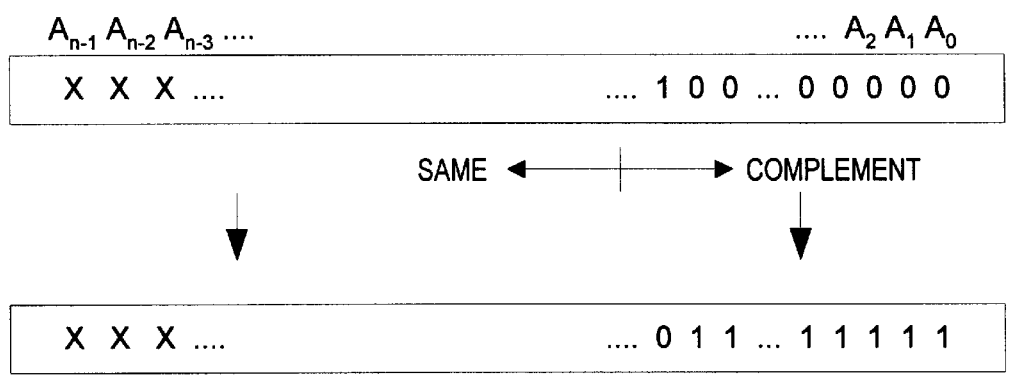
FIG. 5 is a diagram illustrating a decrement of an unsigned n-bit number.

FIG. 5 is a diagram illustrating a decrement of an unsigned n-bit number. As shown, the decrement is accomplished by complementing each input bit from the least significant bit $A_0$ through the first bit $A_x$ that has a logical "1" value. For example, if an 8-bit input has a binary value of "00001000" (i.e., "8" decimal), bits $A_0$, $A_1$, $A_2$, and $A_3$ are each complemented (since the least significant bit that has a logical "1" value is $A_3$), resulting in a decremented value of binary "00000111" (i.e., "7" decimal). An input signal value of all "0"s will result in an underflow condition when decremented. One skilled in the art will appreciate that the ones-complement technique of decrementing a signal is easily extendable to an n-bit input signal of any length n (e.g., 16-, 32-, 64-, 128-, 256- and higher bit integers).

Figure 6A:
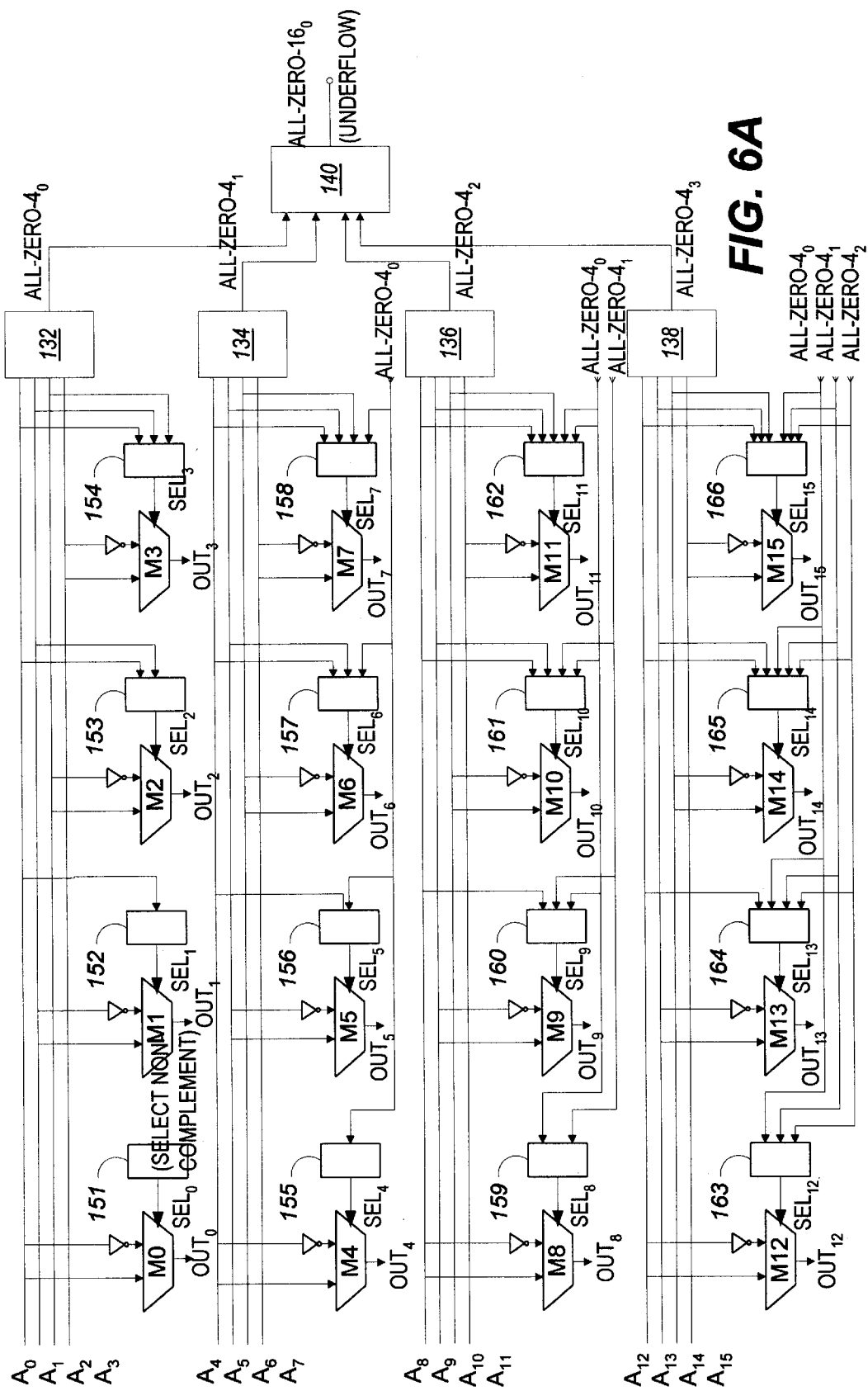
FIG. 6A is a block diagram of a preferred embodiment 16-bit decrementer.
Figure 6B:
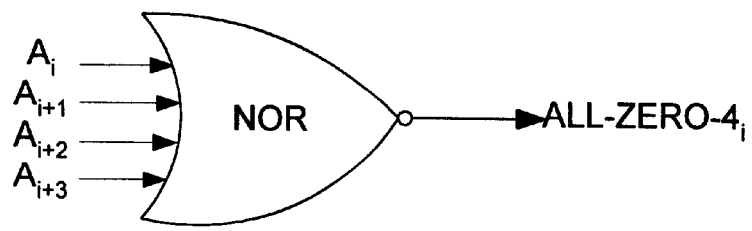
FIG. 6B is a logic diagram of a preferred embodiment of a group all-zero evaluator implemented in accordance with the invention.
Figure 6C:
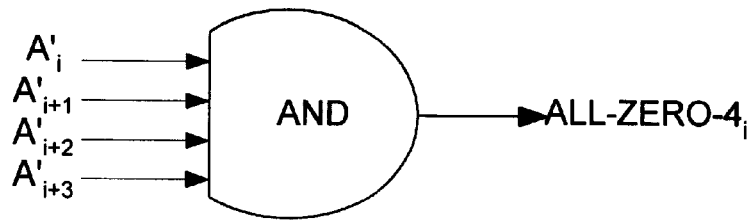
FIG. 6C is a logic diagram of an alternative preferred embodiment of a group all-zero evaluator implemented in accordance with the invention.
Figure 6D:
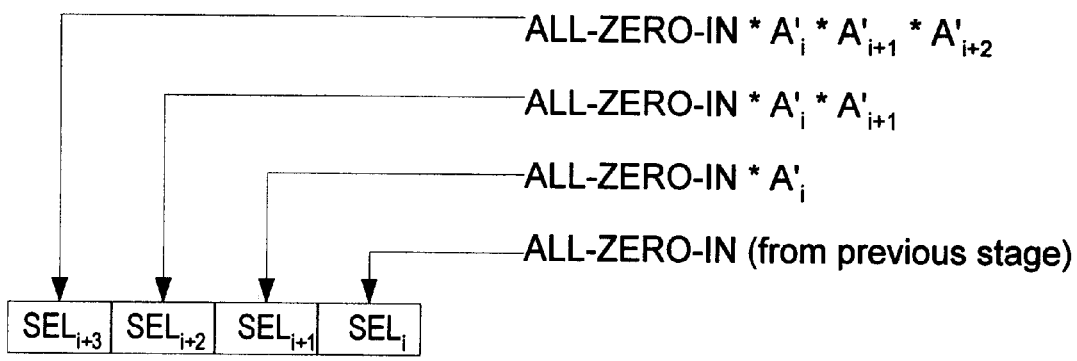
FIG. 6D is a diagram illustrating a preferred embodiment of the partial evaluator circuit for each bit grouping.

A preferred embodiment 16-bit decrementer is implemented as shown in FIG. 6A, with group all-zero evaluators 132, 134, 136, 138 and all partial all-zero evaluators 151–166 calculating whether all inputs are "0"s (rather than all "1"s as in the incrementer of FIG. 4A). A preferred embodiment implementation of group all-zero evaluators 132, 134, 136, 138 is shown in FIG. 6B, using a NOR gate for each group all-zero evaluator that receives the uncomplemented group bit signals. An alternative embodiment is shown in FIG. 6C using an AND gate that receives the complements of each of the same inputs. A preferred embodiment of the partial all-zero evaluator circuit for each bit grouping is illustrated in FIG. 6D.

Figure 7A:
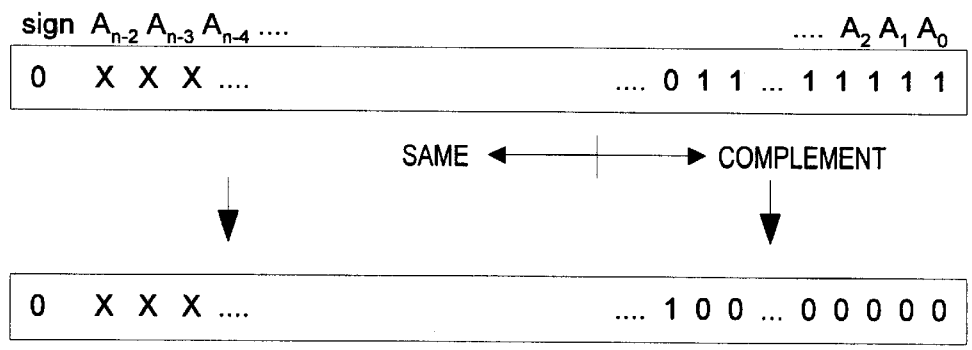
FIG. 7A is a diagram illustrating an increment operation of a twos-complement number, where the sign bit indicates the number is positive.
Figure 7B:
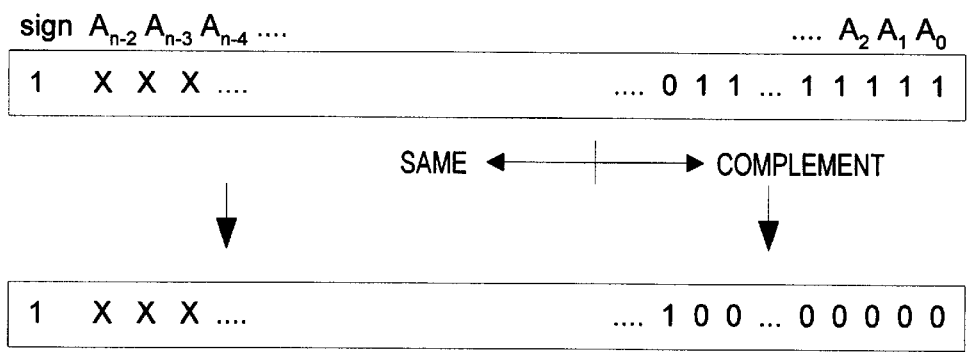
FIG. 7B is a diagram illustrating an increment operation of a twos-complement number, where the sign bit indicates the number is negative.

The invention may be used to perform an increment or decrement of a twos-complement number. FIG. 7A illustrates the increment operation of a positive twos-complement number, where the sign bit indicates the number is positive. FIG. 7B illustrates the increment operation of a negative twos-complement number, where the sign bit indicates the number is negative. As illustrated, in both the positive and negative number cases, each of the bits of the number, including the sign bit, is complemented or not complemented in the same manner as the unsigned number of FIG. 2. An input signal value of all "1"s and a sign bit value of "0" will result in an overflow condition when incremented.

Figure 8A:
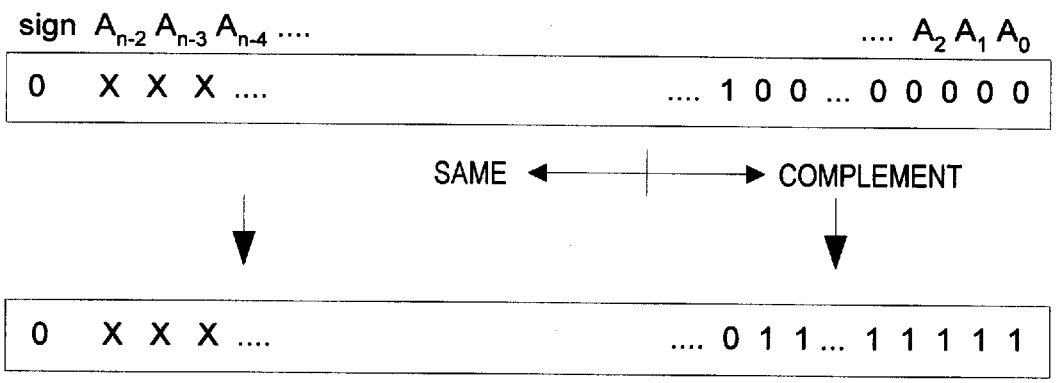
FIG. 8A is a diagram illustrating a decrement operation of a twos-complement number, where the sign bit indicates the number is positive.
Figure 8B:
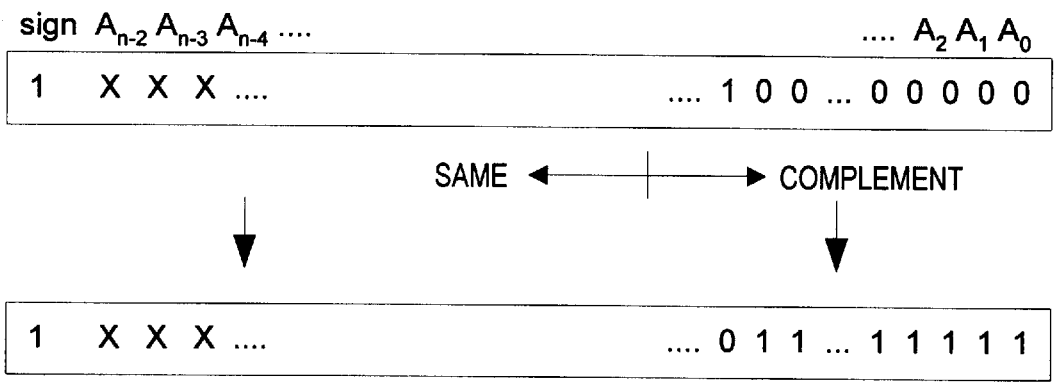
FIG. 8B is a diagram illustrating a decrement operation of a twos-complement number, where the sign bit indicates the number is negative.

FIG. 8A illustrates the decrement operation of a positive twos-complement number, where the sign bit indicates the number is positive. FIG. 8B illustrates the decrement operation of a negative twos-complement number, where the sign bit indicates the number is negative. As illustrated, in both the positive and negative number cases, each of the bits of the number, including the sign bit, is complemented or not complemented in the same manner as the unsigned number of FIG. 5. An input signal value of all "0"s and a sign bit value of "1" will result in an underflow condition when decremented.

Figure 9A:
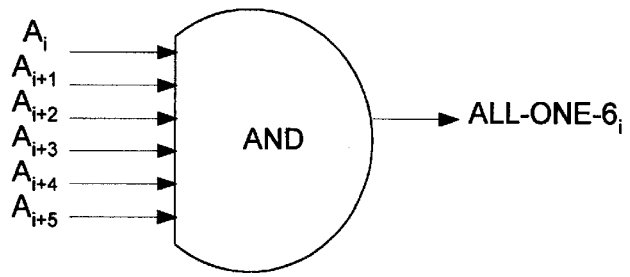
FIG. 9A is a logic diagram of one embodiment of a 6-bit evaluator.
Figure 9B:
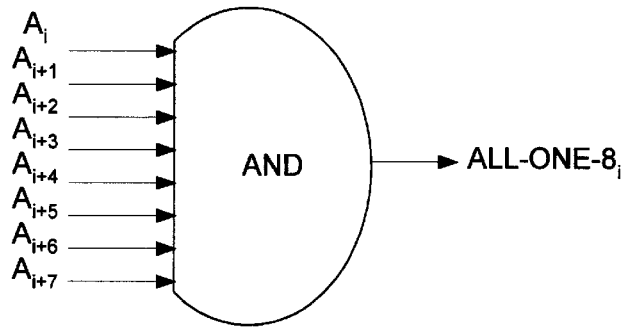
FIG. 9B is a logic diagram of one embodiment of an 8-bit evaluator.

It is to be understood that the groupings of the input bits is arbitrary. Thus, although the illustrative embodiments show 4-bit groupings, any number of bits can be input to the group- and partial-evaluators so long as the evaluators have the capacity to properly perform their evaluation functions with the number of inputs in the group. Accordingly, input signal bits may be grouped in groups of 6, 8, or any other number. In addition, the number of bits in each group may vary. For example, for a 30-bit number, there may be three 8-bit groupings (e.g., $A_0 \ldots A_7$, $A_8 \ldots A_{15}$, $A_{16} \ldots A_{23}$) and one 6-bit grouping (e.g., $A_{24}$–$A_{29}$). This grouping would utilize three 8-bit group evaluators and one 6-bit group evaluator. FIG. 9A illustrates a logic diagram of one embodiment of a 6-bit evaluator 92. FIG. 9B illustrates a logic diagram of one embodiment of an 8-bit evaluator 94.

Although the invention has been described in terms of the illustrative embodiments, it will be appreciated by those skilled in the art that various changes and modifications may be made to the illustrative embodiments without departing from the spirit or scope of the invention. It is intended that the scope of the invention not be limited in any way to the illustrative embodiment shown and described but that the invention be limited only by the claims appended hereto.

What is claimed is:

1. A circuit which increments/decrements an n-bit input signal, comprising:

a multiplexer circuit which receives said n-bit input signal and a complement of said input signal, and outputs an n-bit output signal and overflow/underflow indicator which indicates whether said output signal is valid, said multiplexer receiving a select signal which selects on a bit-wise basis one or the other of said input signal bit and said complement input signal bit for output as the corresponding bit of said n-bit output signal;

a selection circuit which generates said select signal and, for each of said n bits of said input signal, selects one or the other of said input signal bit and said complement input signal bit for output as said corresponding output signal bit, said selection circuit comprising:

a plurality of group all-one evaluators, each corresponding to a mutually-exclusive grouping of successively significant bits of said input signal, and each determining and indicating via a corresponding group all-one evaluator output signal whether all of said bits in said corresponding grouping have a logical "1" value; and a plurality of partial all-one evaluators, each corresponding to one of said input signal bits and zero or more lower significant group all-one evaluators, and each determining and indicating, as said selection signal to said multiplexer corresponding to said corresponding partial all-one evaluator input signal bit, whether each input signal bit that comprises a lower significant bit than said corresponding partial all-one evaluators input signal bit that is also not included in one of said groupings of said lower significant group all-one evaluators has a logical "1" value and each of said corresponding lower significant group all-one evaluators indicate that all of said bits in said corresponding lower significant group all-one evaluator grouping have a logical "1" value, wherein each said lower significant group all-one evaluators comprises each of said plurality o group all-one evaluators that correspond to a mutually-exclusive grouping wherein all of said successively significant bits in said corresponding mutually-exclusive grouping comprises a lower significant bit than said corresponding partial all-one evaluator input signal bit;

wherein if an increment operating is performed, said complement input signal bit is selected if all lower significant input signal bits of said input signal bit have a logical "1" value and said input signal bit is selected if any of said lower significant input signal bits of said input signal bit have a logical "0" value.

2. A circuit in accordance with claim 1, wherein:

each of said plurality of group all-one evaluators comprises a logical AND gate coupled to receive each of said successively significant bits of said input signal that are in said corresponding mutually-exclusive grouping; and each of said plurality of partial all-one evaluators comprise a logical AND gate coupled to receive each of said outputs of said corresponding group all-one evaluators and each of said corresponding lower significant bits that are not included in one of said groupings of said lower significant group all-one evaluators.

3. A circuit in accordance with claim 1, wherein:

each of said plurality of group all-one evaluators comprises a logical NOR gate coupled to receive complements of each of said successively significant bits of said input signal that are in said corresponding mutually-exclusive grouping; and each of said plurality of partial all-one evaluators comprise a logical NOR gate coupled to receive complements of each of said outputs of said corresponding group all-one evaluators and complements of each of said corresponding lower significant bits that are not included in one of said groupings of said lower significant group all-one evaluators.

4. A circuit in accordance with claim 1, wherein said n-bit signal comprises a two's-complement number comprising an (n−1)-bit value and a sign bit, and an overflow condition is indicated if all input signal bits in said (n−1)-bit value have a logical "1" value and the sign bit indicates that said two's-complement number is positive.

5. A circuit in accordance with claim 4, wherein:

each of said plurality of group all-one evaluators comprises a logical AND gate coupled to receive each of said successively significant bits of said input signal that are in said corresponding mutually-exclusive grouping; and each of said plurality of partial all-one evaluators comprise a logical AND gate coupled to receive each of said outputs of said corresponding group all-one evaluators and each of said corresponding lower significant bits that are not included in one of said groupings of said lower significant group all-one evaluators.

6. A circuit in accordance with claim 4, wherein:

each of said plurality of group all-one evaluators comprises a logical NOR gate coupled to receive complements of each of said successively significant bits of said input signal that are in said corresponding mutually-exclusive grouping; and each of said plurality of partial all-one evaluators comprise a logical NOR gate coupled to receive complements of each of said outputs of said corresponding group all-one evaluators and complements of each of said corresponding lower significant bits that are not included in one of said groupings of said lower significant group all-one evaluators.

7. A circuit in capacitive coupling with claim 1, wherein:

wherein if a decrement operation is performed, said complement input signal bit is selected if all lower significant input signal bits of said input signal bit not including the sign bit have a logical "0" value and said input signal bit is selected if any of said lower significant input signal bits of said input signal bit not including the sign bit have a logical "1" value.

8. A circuit in accordance with claim 7, wherein:

said selection circuit comprises:

a plurality of group all-zero evaluators, each corresponding to a mutually-exclusive grouping of successively significant bits of said input signal, and each determining and indicating via a corresponding group all-zero evaluator output signal whether all of said bits in said corresponding grouping have a logical "0" value; and a plurality of partial all-zero evaluators, each corresponding to one of said input signal bits and zero or more lower significant group all-zero evaluators, and each determining and indicating, as said selection signal to said multiplexer corresponding to said corresponding partial all-zero evaluators input signal bit, whether each input signal bit that comprises a lower significant bit than said corresponding partial all-zero evaluator input signal bit that is also not included in one of said groupings of said lower significant group all-zero evaluators has a logical "0" value and each of said corresponding lower significant group all-zero evaluators indicate that all of said bits in said corresponding lower significant group all-zero evaluator grouping have a logical "0" value, wherein each said lower significant group all-zero evaluators comprises each of said plurality of group all-zero evaluators that correspond to a mutually-exclusive grouping wherein all of said successively significant bits in said corresponding mutually-exclusive grouping comprise a lower significant bit than said corresponding partial all-zero evaluators input signal bit.

9. A circuit in accordance with claim 8, wherein:

each of said plurality of group all-zero evaluators comprises a logical AND gate coupled to receive each of said successively significant bits of said input signal that are in said corresponding mutually-exclusive grouping; and each of said plurality of partial all-zero evaluators comprise a logical AND gate coupled to receive each of said outputs of said corresponding group all-zero evaluators and each of said corresponding lower significant bits that are not included in one of said groupings of said lower significant group all-zero evaluators.

10. A circuit in accordance with claim 8, wherein:

each of said plurality of group all-zero evaluators comprises a logical NOR gate coupled to receive complements of each of said successively significant bits of said input signal that are in said corresponding mutually-exclusive grouping; and each of said plurality of partial all-zero evaluators comprise a logical NOR gate coupled to receive complements of each of said outputs of said corresponding group all-zero evaluators and complements of each of said corresponding lower significant bits that are not included in one of said groupings of said lower significant group all-zero evaluators.

11. A circuit in accordance with claim 1, wherein said n-bit signal comprises a two's-complement number comprising an (n−1)-bit value and a sign bit, and an underflow condition is indicated if all input signal bits in said (n−1)-bit value have a logical "0" value and the sign bit indicates that said two's-complement number is negative.

12. A circuit in accordance with claim 11, wherein:

said selection circuit comprises:

a plurality of group all-zero evaluators, each corresponding to a mutually-exclusive grouping of successively significant bits of said input signal, and each determining and indicating via a corresponding group all-zero evaluator output signal whether all of said bits in said corresponding grouping have a logical "0" value; and a plurality of partial all-zero evaluators, each corresponding to one of said input signal bits and zero or more lower significant group all-zero evaluators, and each determining and indicating, as said selection signal to said multiplexer corresponding to said corresponding partial all-zero evaluators input signal bit, whether each input signal bit that comprises a lower significant bit than said corresponding partial all-zero evaluator input signal bit that is also not included in one of said groupings of said lower significant group all-zero evaluators has a logical "0" value and each of said corresponding lower significant group all-zero evaluators indicate that all of said bits in said corresponding lower significant group all-zero evaluator grouping have a logical "0" value, wherein each said lower significant group all-zero evaluators comprises each of said plurality of group all-zero evaluators that correspond to a mutually-exclusive grouping wherein all of said successively significant bits in said corresponding mutually-exclusive grouping comprise a lower significant bit than said corresponding partial all-zero evaluators input signal bit.

13. A circuit in accordance with claim 12, wherein:

each of said plurality of group all-zero evaluators comprises a logical AND gate coupled to receive each of said successively significant bits of said input signal that are in said corresponding mutually-exclusive grouping; and each of said plurality of partial all-zero evaluators comprise a logical AND gate coupled to receive each of said outputs of said corresponding group all-zero evaluators and each of said corresponding lower significant bits that are not included in one of said groupings of said lower significant group all-zero evaluators.

14. A circuit in accordance with claim 12, wherein:

each of said plurality of group all-zero evaluators comprises a logical NOR gate coupled to receive complements of each of said successively significant bits of said input signal that are in said corresponding mutually-exclusive grouping; and each of said plurality of partial all-zero evaluators comprise a logical NOR gate coupled to receive complements of each of said outputs of said corresponding group all-zero evaluators and complements of each of said corresponding lower significant bits that are not included in one of said groupings of said lower significant group all-zero evaluators.

* * * * *

UNITED STATES PATENT AND TRADEMARK OFFICE
CERTIFICATE OF CORRECTION

PATENT NO.   : 6,665,698 B1
DATED        : December 16, 2003
INVENTOR(S)  : Li C. Tsai et al.

It is certified that error appears in the above-identified patent and that said Letters Patent is hereby corrected as shown below:

Column 7,
Line 47, delete "o" and insert therefor -- of --

Signed and Sealed this

Third Day of May, 2005

JON W. DUDAS
*Director of the United States Patent and Trademark Office*